US006153045A

United States Patent [19]

Soltysiak et al.

[11] Patent Number: 6,153,045

[45] Date of Patent: Nov. 28, 2000

[54] APPARATUS FOR MANUFACTURING LINERLESS LABELS

[75] Inventors: John R. Soltysiak, Blasdell; John C. Bane, Grand Island; Frank L. Benchik, Pendleton; Paul M. Cumming, Grand Island; Jimme A. Harrod, Grand Island; Dennis D. Hubbell, Grand Island; Khaled M. Khatib, Youngstown; Joseph W. Langan, Cheektowaga; Nancy G. Mitchell, Grand Island; Daniel P. Ratka, Amherst; Timothy J. Russ, Lewiston; Francis R. Smith, North Tonawanda, all of N.Y.

[73] Assignee: Moore Business Forms, Inc., Grand Island, N.Y.

[21] Appl. No.: 08/449,327

[22] Filed: May 24, 1995

Related U.S. Application Data

[62] Division of application No. 08/253,787, Jun. 3, 1994, Pat. No. 5,518,762.

[51] Int. Cl.[7] .............................. B32B 31/12; B05D 5/10; B05C 5/04

[52] U.S. Cl. ......................... 156/379.6; 156/387; 156/390; 156/459; 156/499; 156/510; 156/578; 118/325; 118/641

[58] Field of Search ..................................... 118/410, 411, 118/419, 325, 641; 156/252, 277, 278, 289, 379.6, 387, 390, 459, 499, 510, 578; 427/208, 208.4, 208.6, 208.8

[56] References Cited

U.S. PATENT DOCUMENTS

| | | | |
|---|---|---|---|
| 4,528,055 | 7/1985 | Hattemer | 456/247 |
| 4,589,141 | 5/1986 | Christian et al. | 382/14 |
| 4,851,383 | 7/1989 | Fickenscher et al. | 503/200 |
| 5,090,942 | 2/1992 | Traise | 462/66 |
| 5,141,915 | 8/1992 | Roenigk et al. | 503/277 |
| 5,354,588 | 10/1994 | Mitchell et al. | 428/40 |

*Primary Examiner*—Curtis Mayes
*Attorney, Agent, or Firm*—Nixon & Vanderhye P.C.

[57] ABSTRACT

An apparatus and method provide for the alternate manufacture of permanent adhesive or repositional linerless labels utilizing the same equipment. Indicia is applied such as by using an intelligent imaging system by at least one print station. With repositional labels, a tie coat is applied and dried, whereas with permanent labels a barrier coating is applied. Coating stations apply a repositional adhesive and release coat in the construction of repositional adhesive labels. The coating station is followed by a dryer and chill rolls. In the construction of permanent adhesive labels a coating station for applying a release coat and a release coat curing station, as well as permanent adhesive application station, are also provided. Changeover time from the manufacture of one type of label to the other is short.

21 Claims, 2 Drawing Sheets

APPARATUS FOR MANUFACTURING LINERLESS LABELS

This is a divisional of application Ser. No. 08/253,787, filed Jun. 3, 1994 now U.S. Pat. No. 5,518,762.

BACKGROUND AND SUMMARY OF THE INVENTION

Linerless labels are becoming increasingly more popular due to the inherent advantages associated therewith, as a result of not requiring a separate release sheet. Typical linerless labels are disclosed in U.S. Pat. Nos. 5,292,713 and 4,978,415, U.S. Pat. Nos. 5,354,588 and 5,417,783 and co-pending applications Ser. Nos. 07/907,511 filed Jul. 1, 1992, U.S. Pat. No. 5,624,345 and 08/078,918 filed Jun. 2, 1993 the disclosures of which are hereby incorporated by reference herein.

There are several major types of linerless labels that are common; repositional adhesive labels, removable adhesive labels and permanent adhesive labels. Different types of equipment are necessary in order to make these different types of linerless labels because of the widely divergent characteristics, drying methods, and the like of the adhesives and release coats that are used in the manufacture thereof. Since it is highly desirable to print or otherwise image the labels during manufacture thereof, equipment costs can be high to construct and maintain different equipment lines. Therefore if the demand for the different types of labels varies significantly, as often occurs in practice, some equipment may be left idle while other equipment is stressed to capacity.

According to the present invention a method and apparatus are provided which allow the alternative construction of either permanent adhesive or repositional adhesive labels utilizing the same equipment. According to the invention the changeover time from the manufacture of one type of labels to the other is short, and many of the components can be used for both types of labels despite their significant differences. This allows a minimum expenditure of capital and maximum flexibility in accommodating market needs.

According to one aspect of the present invention, apparatus is provided for alternatively manufacturing permanent adhesive or repositional adhesive linerless labels. The apparatus includes a plurality of components spaced from each other in a first direction which comprises the direction of travel of a web acted upon by the apparatus to produce the linerless labels. The components comprise the following: An indicia applying station. A first coating station for applying the tie coat in the construction of repositional adhesive labels. A second coating station for optionally applying a barrier coat in the construction of permanent adhesive labels, or repositional adhesive in the construction of repositional adhesive labels. A third coating station for applying a release coat in the construction of repositional adhesive labels. A dryer capable of drying both sides (faces) of a web at the same time, located downstream of the second coating station. Chill rolls for cooling a web and pulling a web from the dryer. A fourth coating station for applying a release coat in the construction of permanent adhesive labels. A release coat curing station for curing a release coat in the construction of permanent adhesive labels. And, a permanent adhesive application station.

The indicia applying section may comprise a variable intelligent imaging system such as ion deposition (e.g. MIDAX®. Indigo, Xeikon), ink jet, or like imaging equipment, and at least one print station such as that typically provided on an in-line web printing press, such as a Webtron press, available from Webtron of Fort Lauderdale, Fla. If four color printing of both sides of the linerless labels is desired, eight print stations will be provided.

The components may be in the sequence recited above (with the imaging system being the most upstream component and the permanent adhesive station the most downstream component in the first direction), or the sequence can be changed, as long as there is appropriate drying or curing of the various coats once applied.

A web unwind assembly is typically provided upstream of the variable intelligent imaging system in the first direction, and a web rewind assembly downstream of the permanent adhesive application station. A perf station for applying perfs in a second direction generally perpendicular to the first direction is also preferably provided typically before the second coating station. A video inspection station may be provided immediately adjacent and downstream of the perf station. A sheeter and longitudinal perf station may be disposed between the permanent adhesive station and the rewind assembly, and a metered infeed assembly may be provided between the unwind assembly and the imaging system.

The fourth coating station may comprise a UV silicone release coat application station. The release coat curing station may comprise a UV curing is station including nitrogen inerted UV curing and an oxygen analyzer with a nitrogen flow control system. A turning mechanism may be associated with the variable intelligent imaging system and first coating station to allow twosided imaging of a web used to produce the labels in a convenient manner, and bypass means (such as the diverter roll or rollers) may be provided for bypassing an individual component when not in use.

The invention also relates to a method of alternatively manufacturing either permanent adhesive linerless labels or repositional adhesive linerless labels utilizing common equipment. The method comprises the steps of automatically: (a) Continuously feeding a web of label substrate material having first and second faces so that it moves in a first direction. And while practicing step (a): (b) Imaging indicia on one or both of the faces of the web. Alternatively practicing step (c) or step (d) as follows: (c) If repositional adhesive linerless labels are being manufactured, applying and drying a tie coat to the first face of the web, applying a repositional adhesive to the first face of the web, applying a release coat to the second face of the web, and drying the release coat and repositional adhesive at the same time. (d) If permanent adhesive linerless labels are being manufactured, applying a barrier coat to the first face of the web, drying the barrier coat, and then applying a release coating over the barrier coat and curing the release coat, and applying a permanent adhesive to the second face. (e) Applying perfs to the web in a second direction substantially transverse to the first direction to define labels in the web. (f) Taking up the web after the practice of steps (b), (c) or (d), and (e); and (g) occasionally (e.g. periodically, intermittently, or typically simply when desired) changing over from step (c) to step (d), and vice versa.

During the practice of step (c) a tie coat may be applied to the web first face prior to the repositional adhesive being applied to the first face. The barrier coat or the repositional adhesive may be applied by the same coater depending upon whether step (c) or step (d) is practiced. During the practice of step (c) the repositional adhesive and release coat are dried simultaneously by a two sided hot air dryer. Step (d) may be practiced by applying a UV silicone release coat, and UV curing release coat prior to the application of the permanent adhesive, which may be hot melt, water based or the like adhesives. Video inspection of the perfs formed after the practiced of step (e) may also be effected. The application of permanent adhesive and the barrier coat may be pattern coated or applied in a continuous format, depending on the particular application.

The invention also relates to a method of automatically manufacturing a web of permanent adhesive linerless labels from a web of substrate material having first and second faces. This method comprises the steps of: Imaging indicia on at least one face of the substrate. Optionally, perfing the substrate web to define labels. Alternatively, the labels may be severed from the web by a cutter and then fed to a sheeter to collect the cut labels in a stack. Applying a barrier coat to the first face of the substrate. Hot air drying the barrier coat. Applying a UV silicone release coat to the first face of the substrate. UV curing the UV silicon release coat. Applying a permanent adhesive to the second face of the substrate. And, taking up the web of linerless labels produced. The steps as recited above are preferably practiced sequentially. The repositionable adhesive and the tie coat may be pattern coated or applied in a continuous format, depending on the particular application.

The invention also contemplates a method of automatically manufacturing a web of repositional adhesive linerless labels from a web of substrate material having first and second faces. The method comprises the steps of: Imaging indicia on at least one face of the substrate. Optionally, perfing the substrate web to define labels. Applying a tie coat to the first face of the web and drying the tie coat. Applying a repositional adhesive to the first face of the substrate and a release coat to the second face. Simultaneously hot air drying the adhesive and release coats. And, taking up the web of repositional adhesive linerless labels produced. The steps recited above may be practiced sequentially.

It is the primary object of the present invention to provide a simple yet effective apparatus and method for the alternative manufacture of repositional adhesive linerless labels or permanent adhesive linerless labels. This and other objects of the invention will become clear from an inspection of the detailed description of the invention, and from the appended claims.

DETAILED DESCRIPTION OF THE DRAWINGS

Figure 1:
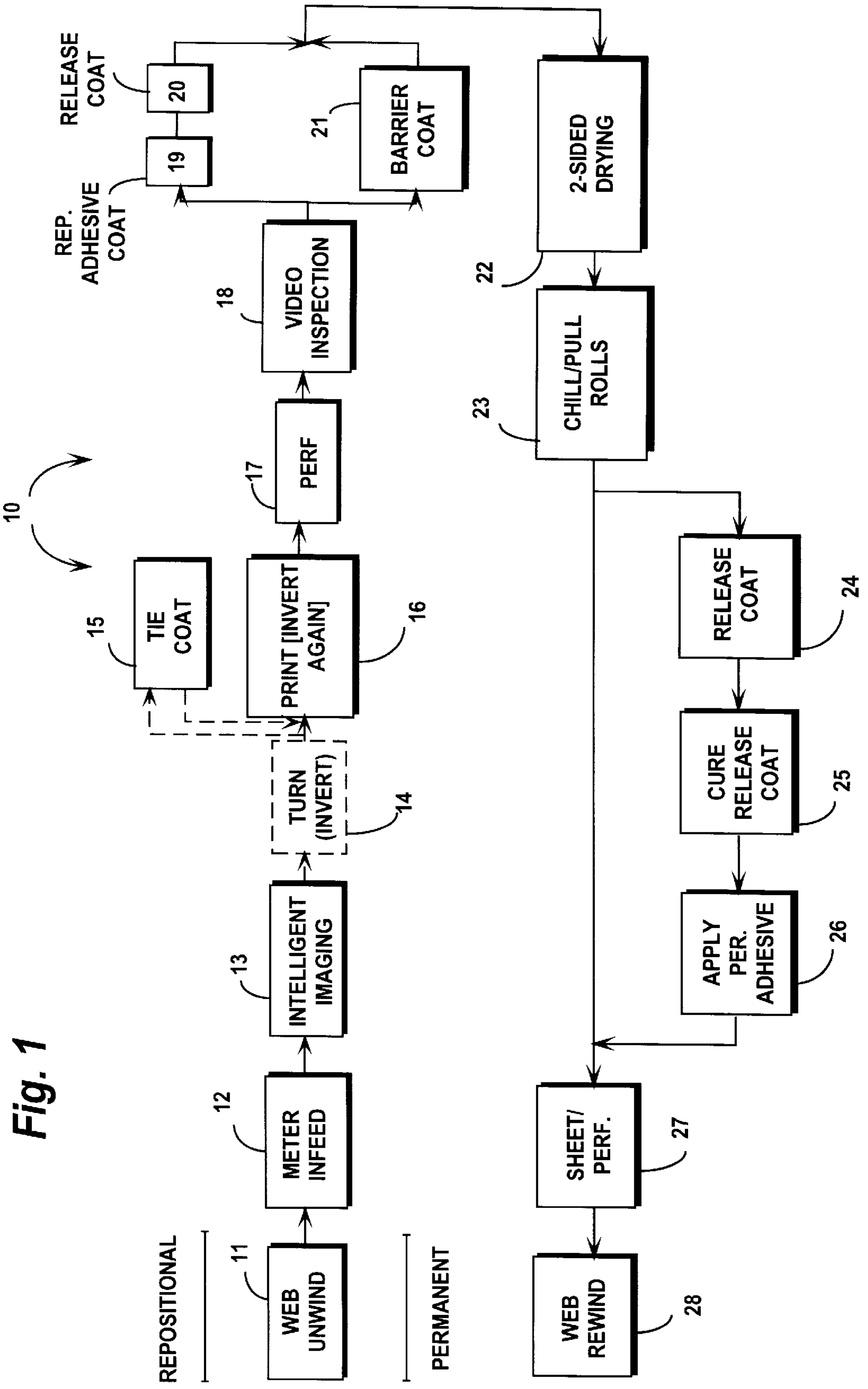
FIG. 1 is a schematic representation of the method steps that may be practiced according to the present invention.
Figure 3:
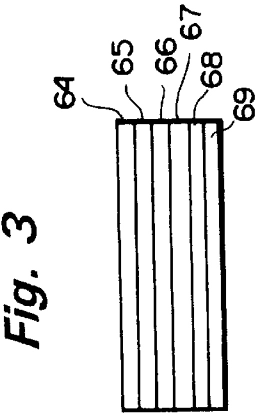
FIGS. 3 and 4 are schematic side views (greatly enlarged for clarity of illustration) of an exemplary repositional adhesive linerless label and an exemplary permanent adhesive linerless label, respectively, produced according to the present invention.
Figure 4:
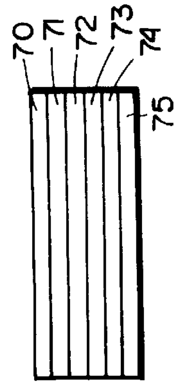

FIG. 1 schematically illustrates a process 10 which may be utilized to produce either repositional adhesive linerless labels (FIG. 3) or permanent adhesive linerless labels (FIG. 4). The steps that are used to produce both types of labels are shown in line. While those specific to the repositional adhesive label manufacture are shown above and those specific to the permanent adhesive label manufacture are shown below.

The web is typically unwound at box 11. A wide variety of webs may be utilized for the manufacture of the labels, and conventional web substrates include bond paper, coated papers, and films such as vinyl, polypropylene and polyethylene films. The web may be meter in-fed—as indicated by box 12—to an intelligent imaging stage, indicated at 13 in FIG. 1. Associated with the intelligent imaging stage 13 may an inverting stage indicated at 14. Where repositional adhesive labels are to be produced. a tie coat application stage 15 is provided, whereas for both types of labels one or a plurality of print stages—indicated schematically at 16 in FIG. 1—are provided.

Desirably perfing is done early in the web processing, as indicated at stage 17 in FIG. 1, horizontal perfs being optionally applied to define the different labels in the direction of web movement (the first direction), which is indicated schematically by the direction of arrows in FIG. 1. Alternatively, the labels may be severed from the web by a cutting means (not shown). A video inspection station 18 may be provided after the perf station 17. After video inspection, the same equipment can be utilized to practice the repositional adhesive coat stage 19, or a barrier coat stage 21, for the repositional or permanent adhesive labels, respectively. A release coat station 20 for the manufacture of repositional adhesive labels is also desirably provided here in the sequence too.

After stages 19 through 21, drying is necessary, therefore the web passes to the drying stage 22. The drying stage 22 is capable of drying both faces or sides at the same time although if a barrier coat is applied to only one of the faces in the manufacture of permanent adhesive linings one of the heat sources associated with the dryer 22 can be turned off. Typically the heated web is cooled by being driven by the chill rolls of the chill roll take-up station 23. Normally downstream of the station 23 stages specific to the manufacture of permanent adhesive linerless labels are provided, i.e. the release coat stage 24, release coat curing stage 25, and permanent adhesive application stage 26.

After construction of the labels, in web form, they are often sheeted or longitudinally (in the first direction, the direction of web movement) perfed as indicated at stage 27, and then rewound as indicated at stage 28.

While a wide variety of materials may be used in each of the application stations set forth above, some materials have been found to be particularly useful. For example in the practice of step 21 barrier coatings available from Franklin International Corporation and sold under the trade name Duracet 122 may be applied, e.g. at a dry coat weight of about 3.76 grams per square meter ±10%.

In the practice of step 24 a UV silicone coating is particularly useful since it not only provides the release coat for permanent adhesive moved against it, but also acts as a protective and visually pleasing coating over the product. Two different types of UV silicone products may be used. One is General Electric Silicone UV 9300 with photo initiator UV 9310C (2.5%). Another is Goldschmidt Silicone, such as a mix of Goldschmidt RC726 (65%) with RC711 (35%), with photo initiator 1173 (2%) added. Both UV silicones are typically provided at a dry coat weight of about 1.5 grams per square meter ±10%. Other overcoatings, such as varnishes or the like, may be used to provide additional protective layers over the printing.

At the permanent adhesive application stage 26 hot melt permanent adhesive may be applied, such as Duratek 34–4144 available from National Starch. Application temperatures typically about 300–350° F., and the dry coat weight is typically about 25.4 grams per square meter ±10%. The hot melt adhesive cools and cures instantly. therefore no separate drying or curing stage is necessary.

In the practice of step 15 as described above, a desirable tie coat solution is 2.56 parts Cabosperse (20% solids) and one part polyvinyl alcohol (5% solids), applied with a dry coat weight of about 1.13 grams per square meter ±10%.

The repositional adhesive added at station 19 may be any suitable commercially available repositional adhesive. One particularly desirable adhesive is CLEANTAC® adhesive available from Moore Business Forms, Inc. of Lake Forest, Ill. This may typically be applied at a dry coat weight of about 9.4 grams per square meter ±10%.

The release coat applied at station 20 preferably is an aqueous release coat, such as a solution of 20% Quillon C and 80% water. It may be applied with a dry coat weight of about 0.15 grams per square meter ±10%. In this instance, Quillon or other similar release coatings provide protection for the indicia. Overprint varnishes or the like may also be provided.

Figure 2:
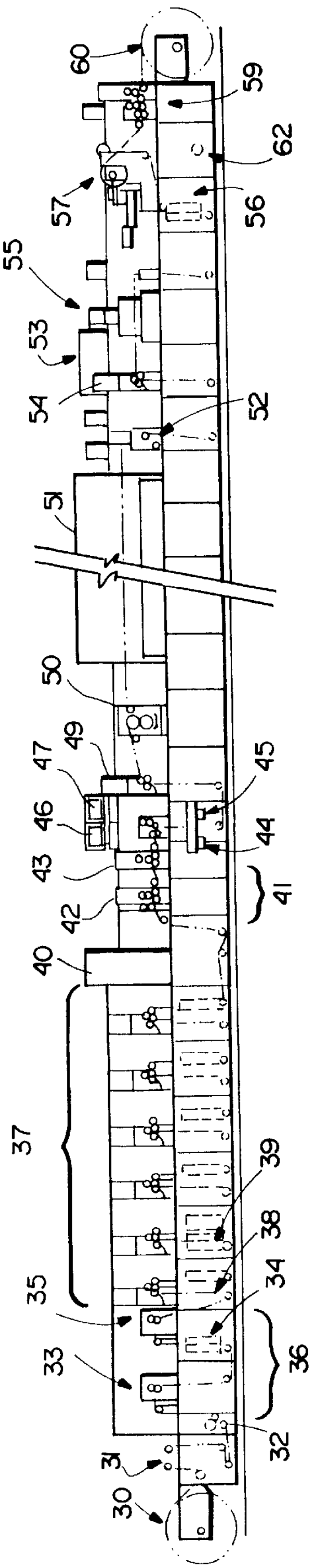
FIG. 2 is a side elevational view showing exemplary apparatus according to the present invention, for practice of the method of FIG. 1.

In order to practice the method schematically illustrated in FIG. 1, equipment such as illustrated in FIG. 2 may be utilized. The equipment is shown in FIG. 2 in a particularly advantageous sequence in the direction of web travel (from left to right in FIG. 2), however some of the stations may be moved around. For example the imaging and print stations described and illustrated may come after application of release or adhesive coats as long as the stations are capable of applying indicia to coated substrate.

One advantage of the equipment illustrated in FIG. 2 is that it is all commercially available. The basic equipment to which all the components are applied may be a lithographic press such as a Topman Moore TMSW20V, available from Topman Moore Co., Ltd. of Japan, a flexographic press such as a Webtron 1618 press, or the like. In a typical sequence for the manufacture of permanent linerless labels the equipment may print, apply a barrier coat, dry, UV silicone coat, UV cure, apply hot melt adhesive, and rewind. In a typical repositional endless label process the equipment may apply and dry a tie coat, print, apply repositional adhesive, apply a release coat, dry both the adhesive and the release coat, and rewind. The equipment is capable of running at a normal operating speed of between 100 and 1500 feet per minute but preferably 500 feet per minute.

The first piece of equipment in the sequence illustrated in FIG. 2 comprises a web unwind apparatus 30, which is optionally followed by an edge guide 31 and a metered web infeed 32 apparatus. Then is provided intelligent imaging such as utilizing the intelligent imaging printheads 33, 35 which have a set of turn bars 34 disposed between them. The components 33 through 35 collectively form an intelligent imaging system 36, which may be of any suitable conventional type such as one employing ion deposition techniques 9 (e.g. MIDAX® printing technology, or Indigo or Xeikon technology), ink jet, laser or impact printer. Typically downstream of the intelligent imaging system 36 are a plurality of print stations indicated collectively at 37. Standard flexography or lithography can be used. Six stations 37 are illustrated in FIG. 2 but any number can be provided from one through eight. In the manufacture of repositional adhesive linerless labels typically the first print station 38 applies a tie coat, while the other stations print. In the embodiment illustrated in FIG. 2, then, in the manufacture of permanent linerless labels six color print stations are available while for repositional adhesive linerless labels five are available. Turn bars 39 may be provided as illustrated. The turn bars 34, 39 allow printing on both sides with ease.

A main drive unit for a Webtron press is illustrated schematically at 40 in FIG. 2, followed by perf station 41, which may comprise two different single die perf units 42, 43. Video inspection is provided downstream of the perf station 41, as by video cameras 44, 45 having monitors 46, 47.

After video inspection a coater 49 is provided for alternatively applying the barrier coat when manufacturing permanent adhesive labels, or repositional adhesive when manufacturing repositional adhesive labels. The coater 49 is easily cleaned during changeover from one type of label to the other. Downstream of the coater 49 is another coater 50. The coater 50—which typically applies Quillon C release coat, in the manufacture of repositional adhesive labels—may comprise a 16.5 inch wide Dahlgren type coater.

After the application of the repositional adhesive on the same face to which the tie coat was applied, and the application of the release coat at 50 to the opposite face, in the manufacture of repositional adhesive labels, the labels pass to the dryer 51. In order to be able to dry both the release coat and the repositional adhesive easily and quickly at the same time, the dryer 51 preferably comprises an air flotation, two-sided dryer with two natural gas fired burners. Each burner can provide about 880,000 BTU/hr. The web temperature leaving the dryer is typically 230° F., and cooling is typically provided by acting on the web with the pull/chill rolls 52. Typically a pair of driven chill/pull rolls 52 are provided which are supplied with cooling water by a two ton chiller to cool the web down to about 150° F.

When permanent adhesive linerless labels are constructed and the coater 49 is used to apply the barrier coat, only one face of the web is "wet", therefore the dryer 51 preferably is provided with zone controls for each of the two faces so that drying action to one of the faces can be turned off when permanent adhesive labels are being constructed.

Downstream of the pull/chill rolls 52 is the coater 53 for applying the release coat (typically UV silicone) in the manufacture of permanent adhesive labels. The cure system 55 preferably is a Fusion UV curing system having 600 watts per inch power. Standard "H" bulbs are used for curing and a light shield provides nitrogen inerting. An oxygen analyzer 54 may be associated therewith to monitor oxygen levels and control nitrogen flow to the UV light shield. The UV cure system is illustrated schematically at 55. Nitrogen inerting is necessary for curing Goldschmidt UV silicone or GE 9300 silicone (which must occur at oxygen levels below 50 ppm) and in such case nitrogen flow is approximately 47 scfm, at 70° F. and 14.7 psi. A liquid nitrogen supply tank may be provided to supply the required flow and purity of nitrogen. Nitrogen inerting is not yet necessary for some UV curing systems, such as for the GE silicone earlier described.

In the embodiment illustrated in FIG. 2, turn bars 56 are provided between the UV cure equipment 55 and the permanent adhesive application equipment 57. The equipment 57 preferably is for applying hot melt adhesive utilizing a hot melt slot die head. The hot melt adhesive is applied by the head to the web against an elastomer covered chill roll supplied with cooling water. For example an elastomer covering of about a half an inch thick (e.g. 90 durometer silicone) may be provided. A standard hopper type melt system with a gear pump may be used to deliver adhesive to the slot die head through a heated hose. The pump may be driven by ad motor with a drive that tracks the press speed to maintain the constant coat weight up to the desired 500 feet per minute operation.

After permanent adhesive application, a sheeter/perf unit 59 may be provided to form sheets and/or longitudinal (in the direction of web movement) perfs. The unit 59 may comprise an in-line slitter. Rewind is provided by the apparatus 60, and since linerless labels are produced during rewind the adhesive face (whether permanent or repositional) of the web substrate comes against the release coat face, which it readily releases from when used by the consumer of the labels.

For each of the pieces of equipment illustrated in FIG. 2, when the equipment is not being used it is "deactivated" either by cleaning it so that if the web moves past it no material is applied (e.g. for the coater 50), or a bypass means may be provided to bypass that piece of equipment. The bypass means may be of any suitable conventional type, such as one or more diverter rolls, loops, or the like. For example illustrated in dotted line and schematically at 62 in FIG. 2 is a diverter roll about which the web may be passed in order to bypass the hot melt adhesive applicator 57 if repositional adhesive labels are being constructed, in that case the web moving directly from preceding units to the apparatus 59.

FIGS. 3 and 4 schematically illustrate repositional adhesive and permanent adhesive linerless labels, respectively, that can be produced according to the invention using the method of FIG. 1 and the apparatus of FIG. 2. In FIG. 3 the release coat, e.g. Quillon C, is provided on one face as indicated at 64, which may have printing (indicia) 65 below it, followed by the substrate of the web (e.g. paper) 66. On the opposite side of the paper web 66 may be the tie coat 67 with printing (indicia) 68 thereon, and with the repositional adhesive 69 on the opposite face from the release coat 64.

For the permanent adhesive linerless label illustrated in FIG. 4, one face is provided by the release coat (e.g. UV silicone) 70, adjacent the barrier coat 71. Printing/indicia 72 may be provided between the barrier coat 71 and the web substrate (e.g. paper) 73. On the opposite side of the paper 73 may. be additional printing/indicia 74, and then the hot melt or like permanent adhesive 75 on the opposite face from the release coat 70. It is understood that during the manufacture of either repositional or permanent labels, the adhesive may be pattern coated or applied in a continuous fashion. Likewise, the barrier and tie coats may also be pattern coated or applied continuously to match the coating of the adhesive.

It will thus be seen that according to the present invention an advantageous method and apparatus are provided for alternatively constructing permanent adhesive or repositional adhesive linerless labels, with a minimum of changeover time and difficulty, and utilizing many equipment components in common so as to minimize capital expenditure and equipment attention. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for alternatively manufacturing permanent adhesive or repositional adhesive linerless labels, comprising a plurality of components spaced from each other in a first direction which comprises the direction of travel of a web acted upon by the apparatus to produce linerless labels, said components comprising:

an indicia applying station for applying indicia on one or both faces of the web moving in the first direction;

a second coating station for selectively applying a barrier coat in the construction of permanent adhesive labels, or applying a repositional adhesive in the construction of repositional adhesive labels, wherein the second coating station is configurable to alternatively apply the barrier coat and the reposition adhesive depending on selections made by a user to the second coating station;

a third coating station for applying a release coat in the construction of repositional adhesive labels;

a dryer capable of drying both sides of a web at the same time, located downstream of said second coating station;

chill rolls for pulling the web from the dryer;

a fourth coating station for applying a release coat in the construction of permanent adhesive labels;

a release coat curing station for curing the release coat in the construction of permanent adhesive labels; and a permanent adhesive application station.

2. Apparatus as recited in claim 1 wherein said indica applying section comprises:

an intelligent imaging system;

a first coating station for applying a tie coat in the construction of repositional adhesive labels; and at least one print station.

3. Apparatus as recited in claim 2 wherein said components are in the sequence recited in said first direction, said imaging system being the most upstream component, and said permanent adhesive station the most downstream component in said first direction.

4. Apparatus as recited in claim 3 further comprising a web unwind assembly upstream of said intelligently imaging system in said first direction, and a web rewind assembly downstream of said permanent adhesive application station.

5. Apparatus as recited in claim 4 further comprising a sheeter and longitudinal perforation station between said permanent adhesive station and said rewind assembly.

6. Apparatus as recited in claim 4 further comprising a metered infeed,assembly between said unwind assembly and said imaging system.

7. Apparatus as recited in claim 3 further comprising a sheeter and longitudinal perf station between said permanent adhesive station and said rewind assembly.

8. Apparatus as recited in claim 2 further comprising a turning mechanism associated with the intelligent imaging system and first coating station to allow two sided imaging of a web used to produce the labels.

9. Apparatus as recited in claim 2 further comprising a perf station for applying perfs in a second direction generally perpendicular to said first direction.

10. Apparatus as recited in claim 9 further comprising a video inspection station immediately adjacent and downstream of said perf station.

11. Apparatus as recited in claim 2 wherein said fourth coating station comprises a UV silicone release coat application station including an oxygen analyzer and control system; and wherein said release coat curing station comprises a UV curing station including nitrogen inerted UV curing.

12. Apparatus as recited in claim 2 further comprising bypass means for bypassing an individual component when not in use.

13. Apparatus as recited in claim 2 further comprising a web unwind assembly upstream of said intelligently imaging system in said first direction, and a web rewind assembly downstream of said permanent adhesive application station.

14. Apparatus as recited in claim 13 further comprising a metered infeed assembly between said unwind assembly and said imaging system.

15. Apparatus as recited in claim 1 further comprising a perforation station for applying perforations in a second direction generally perpendicular to said first direction.

16. Apparatus as recited in claim 15 further comprising a video inspection station immediately adjacent and downstream of said perforation station.

17. Apparatus as recited in claim 15 further comprising bypass means for bypassing an individual component when not in use.

18. Apparatus as recited in claim 1 wherein said fourth coating station comprises a UV silicone release coat application station including an oxygen analyzer and control system; and wherein said release coat curing station comprises a UV curing station including nitrogen inerted UV curing.

19. Apparatus as recited in claim 18 further comprising bypass means for bypassing an individual component when not in use.

20. Apparatus as recited in claim 1 further comprising bypass means for bypassing an individual component when not in use.

21. Apparatus for alternatively manufacturing permanent adhesive or repositional adhesive linerless labels, comprising a plurality of components spaced from one another in a first direction which comprises the direction of travel of a web acted upon by the apparatus to produce linerless labels, said components comprising:

an indicia applying station for applying indicia on one or both faces of the web moving in the first direction;

a second coating station capable of applying a barrier coat in the construction of permanent adhesive labels, and a repositional adhesive in the construction of repositional adhesive labels, wherein the second coating station barrier is configurable to apply the barrier coat or the reposition adhesive depending on a selection made by a user of the second coating station;

a third coating station for applying a release coat in the construction of repositional adhesive labels;

a dryer adapted to dry one side of a web or both sides of the web at the same time, located downstream of said second coating station, wherein said dryer includes a first-side drying zone for drying a first side of the web, a second-side drying zone for drying a second side of the web, and zone controls for selectively activating the first-side and second-side drying zones;

chill rolls for pulling a web from the dryer;

a fourth coating station for applying a release coat in the construction of permanent adhesive labels;

a release coat curing station for curing a release coat in the construction of permanent adhesive labels; and a permanent adhesive application station.

* * * * *